US009596597B2

(12) United States Patent
Patil et al.

(10) Patent No.: US 9,596,597 B2
(45) Date of Patent: Mar. 14, 2017

(54) MOBILE SECURITY PROTOCOL NEGOTIATION

(75) Inventors: Basavaraj Patil, Coppell, TX (US); Gabor Bajko, Mountain View, CA (US)

(73) Assignee: Nokia Technologies Oy, Espoo (FI)

(*) Notice: Subject to any disclaimer, the term of this patent is extended or adjusted under 35 U.S.C. 154(b) by 888 days.

(21) Appl. No.: 12/927,064

(22) Filed: Nov. 5, 2010

(65) Prior Publication Data
US 2012/0117377 A1    May 10, 2012

(51) Int. Cl.
*H04L 29/06*  (2006.01)
*H04W 12/04*  (2009.01)
*G06F 15/16*  (2006.01)
*H04W 80/04*  (2009.01)

(52) U.S. Cl.
CPC ........... *H04W 12/04* (2013.01); *H04L 63/166* (2013.01); *H04L 63/205* (2013.01); *H04W 80/04* (2013.01)

(58) Field of Classification Search
CPC ................................. H04L 12/56; H04L 29/06
USPC .............................................. 713/156; 726/14
See application file for complete search history.

(56) References Cited

U.S. PATENT DOCUMENTS

| 5,794,009 | A  | * | 8/1998 | Coleman et al. | ............... 710/15 |
| 7,219,223 | B1 | * | 5/2007 | Bacchus et al. | ............... 713/150 |
| 2007/0006295 | A1 | * | 1/2007 | Haverinen | .......... H04L 63/0272 726/14 |
| 2008/0098098 | A1 | * | 4/2008 | Onsen | ............... H04L 29/12792 709/222 |

FOREIGN PATENT DOCUMENTS

| EP | 1926277 A1 | 5/2008 | |
| EP | 2244495 A1 | 10/2010 | |
| IT | WO2005/076564 | * 8/2005 | ............. H04L 29/06 12/56 |
| WO | WO 2005076564 A1 | 8/2005 | |
| WO | WO 2008155066 A2 | 12/2008 | |

(Continued)

OTHER PUBLICATIONS

"Mobility EXTensions for IPv6 (mext)", http://datatracker.ietf.org/wg/mext/charter/, Oct. 18, 2010, 2 pgs.

(Continued)

*Primary Examiner* — Joseph Greene
(74) *Attorney, Agent, or Firm* — Harrington & Smith (57) ABSTRACT

A security gateway/home agent controller HAC is used to assign one home agent HA from a plurality of HAs and to identify at least one security protocol that is common between a mobile node MN and the assigned HA. Establishment of a security association between the MN and the assigned HA is enabled according to the identified security protocol and utilizing bootstrapping parameters provided over a secure connection between the security gateway/HAC and the MN. The bootstrapping parameters include at least a home address for the MN, an address of the assigned HA and security credentials and security parameters for the identified at least one security protocol. In an exemplary embodiment the home address for the MN may be an IPv6 home address and the MN may have certain capabilities with respect to security protocols and ciphering suites which the MN sends to the security gateway.

17 Claims, 7 Drawing Sheets

(56) References Cited

FOREIGN PATENT DOCUMENTS

WO    WO 2010086029 A1    8/2010

OTHER PUBLICATIONS

"3rd Generation Partnership Project; Technical Specification Group Services and System Aspects; 3G Security; Security architecture (Release 9)", 3GPP TS 33.102 V9.2.0, Mar. 2010, 72 pgs.
"Authentication Protocol for Mobile IPv6", Patel, et al., Jan. 2006, 19 pgs.
"Transport Layer Security-based Mobile IPv6 Security Framework for Mobile Node to Home Agent Communication draft-korhonen-mext-mip6-altsec-05.txt", Korhonen, et al., Jul. 12, 2010, 38 pgs.
"Mobile IPv6 Bootstrapping in Split Scenario", Giaretta, et al., Oct. 2007, 1 pg.
"DHC9 Options for Home Information Discovery in MIPv6 draft-ietf-mip6-hiopt-17.txt", Jang, et al., May 22, 2008, 23 pgs.
"Mobility Support in IPv6", Johnson et al., Jun. 2004, 165 pgs.
"Using IPsec to Protect MobileIPv6 Signaling Between Mobile Nodes and Home Agents", Arkko, et al., Jun. 2004, 40 pgs.
"Mobile IPv6 Operation with IKEv2 and the Revised IPsec Architecture", V. Devarapalli, et al., Apr. 2007, 28 pgs.
"Mobile IPv6 Support for Dual Stack Hosts and Routers", H. Soliman, Jun. 2009, 41 pgs.

\* cited by examiner

MOBILE SECURITY PROTOCOL NEGOTIATION

TECHNICAL FIELD

The exemplary and non-limiting embodiments of this invention relate generally to secure wireless communication, and particularly relate to establishing such secure communication links between a mobile node and a home agent.

BACKGROUND

The following abbreviations that may be found in the specification and/or the drawing figures are defined as follows:
- AAA authentication, authorization and accounting
- DHCP dynamic host configuration protocol
- DSMIP6 dual stack mobile IPv6
- GW gateway
- HA home agent
- HAC home agent controller
- HoA home address
- IETF internet engineering task force
- IKE internet key exchange protocol
- IP internet protocol
- IPsec internet protocol-secure
- MIP6 mobile IPv6
- MN mobile node (also UE)
- SA security association
- TLS transport layer security
- UE user equipment Mobile IPv6 security is presently based on IPsec and IKE, and further specifications may be seen at USING IPSEC TO PROTECT MOBILE IPv6 SIGNALING BETWEEN MOBILE NODES AND HOME AGENTS (by J. Arkko, V. Devarapalli and F. Dupont; Network Working Group Request for Comments 3776 dated June 2004) and MOBILE IPv6 OPERATION WITH IKEv2 AND THE REVISED IPSEC ARCHITECTURE (by V. Devarapalli and F. Dupont; Network Working Group Request for Comments 4877 dated April 2007). Specifically, a security association is established between the IPsec/IKEv2-capable MN and HA using the IKEv2 signaling protocol. There is an extension of Mobile IPv6 termed dual-stack Mobile IPv6 (DSMIP6) which is specified at MOBILE IPv6 SUPPORT FOR DUAL STACK HOSTS AND ROUTERS (by H. Soliman, Ed.; Network Working Group Request for Comments 5555 dated June 2009). DSMIP6 is a secure mobility solution which follows that specified for Mobile IPv6. Currently, IPsec and IKE or IKEv2 are mandatory for securing Mobile IPv6 signaling messages and traffic between the MN and the HA, and it is optional to also use these protocols for securing the user plane traffic between them. Bootstrapping solutions have also been specified in the IETF and these are based on DHCP options or via the use of IKEv2.

But the IPsec/IKEv2 protocol does not integrate very well with the Mobile IPv6 module within the MN, and there are some significant implementation challenges to make the mandated security protocols work with the underlying IPv6 signaling stack. These are so significant that the IETF MEXT (Mobility extensions for IPv6) working group is now tasked to specify alternate security mechanisms for use with MIP6 and DSMIP6.

SUMMARY

The foregoing and other problems are overcome, and other advantages are realized, by the use of the exemplary embodiments of this invention.

In a first aspect thereof the exemplary embodiments of this invention provide a method, comprising: using a security gateway or HAC to assign one home agent from a plurality of home agents and to identify at least one security protocol that is common between a mobile node and the assigned home agent, and enabling establishment of a security association between the mobile node and the assigned home agent according to the identified at least one security protocol and utilizing bootstrapping parameters provided over a secure connection between the security gateway and the mobile node. In this embodiment the bootstrapping parameters comprise at least a home address for the mobile node, an address of the assigned home agent and security credentials and security parameters for the identified at least one security protocol. By example, the home address for the mobile node may be an IPv6 home address and the mobile node may have certain capabilities with respect to security protocols and ciphering suites which the mobile node sends to the security gateway (or the gateway learns them from an AAA server). The mobile node may prefer to be assigned to an HA which supports certain functionalities such as flow mobility functionality. The security gateway (e.g., home agent controller) can then determine which of the plurality of home agents support the required security mechanism as well, and uses that criteria and possibly others (e.g., current location of the mobile node) to choose the assigned home agent.

In a second aspect thereof the exemplary embodiments of this invention provide a memory tangibly embodying or storing a program of computer readable instructions or computer program code that when executed by at least one processor result in actions comprising: using a security gateway to select one home agent from a plurality of home agents and to identify at least one security protocol that is common between a mobile node and the assigned home agent, and enabling establishment of a security association between the mobile node and the assigned home agent according to the identified at least one security protocol and utilizing bootstrapping parameters provided over a secure connection between the security gateway and the mobile node. In this embodiment the bootstrapping parameters comprise at least a home address for the mobile node, an address of the assigned home agent, and security credentials and security parameters for the identified at least one security protocol. As with the first aspect above, the home address for the mobile node may be an IPv6 home address and the mobile node may have certain capabilities with respect to security protocols and ciphering suites which the mobile node to the security gateway (or the gateway learns them from an AAA server). The mobile node may prefer to be assigned an HA which supports certain functionalities such as flow mobility functionality. The security gateway (e.g., home agent controller) can then determine which of the plurality of home agents support the required security mechanism as well, and uses that criteria and possibly others (e.g., current location of the mobile node) to choose the assigned home agent.

In a third aspect thereof the exemplary embodiments of this invention provide an apparatus, comprising at least one processor and at least one memory including computer program code. The at least one memory and the computer program code are configured, with the at least one processor, to cause the apparatus to perform at least: using a security gateway to select one home agent from a plurality of home agents and to identify at least one security protocol that is common between a mobile node and the assigned home agent, and enabling establishment of a security association between the mobile node and the assigned home agent according to the identified at least one security protocol and utilizing bootstrapping parameters provided over a secure connection between the security gateway and the mobile node. In this embodiment the bootstrapping parameters comprise at least a home address for the mobile node, an address of the assigned home agent, and security credentials and security parameters for the identified at least one security protocol. As with the first and second aspects above, the home address for the mobile node may be an IPv6 home address and the mobile node may have certain capabilities with respect to security protocols and ciphering suites which the mobile node to the security gateway (or the gateway learns them from an AAA server). The mobile node may prefer to be assigned to an HA which supports certain functionalities such as flow mobility functionality. The security gateway (e.g., home agent controller) can then determine which of the plurality of home agents support the required security mechanism as well, and uses that criteria and possibly others (e.g., current location of the mobile node) to choose the assigned home agent.

In a fourth aspect thereof the exemplary embodiments of this invention provide a method comprising: a mobile node using a known (manually configured) address of a home agent to negotiate a security mechanism or protocol between the mobile node and the home agent; and using the negotiated security mechanism or protocol to secure signaling between the mobile node and the home agent.

In a fifth aspect thereof the exemplary embodiments of this invention provide an apparatus comprising at least one processor and at least one memory storing computer program code and a known (manually configured) address of a home agent. The at least one memory and computer program code are configured with the at least one processor to cause the apparatus to perform at least: using the known/manually configured address of the home agent to negotiate a security mechanism or protocol between a mobile node and the home agent; and using the negotiated security mechanism or protocol to secure signaling between the mobile node and the home agent.

These and other aspects of the invention are detailed more fully below.

DETAILED DESCRIPTION

Exemplary embodiments of the invention are in the context of the MN being capable of multiple different security protocols, cipher suites or mechanisms. In this regard there is disclosed with reference to FIGS. 2-4 a negotiation between the MN and a controlling network node, such as a HAC (or more generically a security GW), in order to select one such security protocol and to select an appropriate HA with whom the MN can establish a security association using the selected security protocol. Also detailed with respect to FIG. 5 is an arrangement in which the MN negotiates directly with a HA for whom the MN knows a priori the IPv6 address of that HA. FIG. 5 utilizes a specified non-secure message exchange and thereafter the security association is established.

When multiple security mechanisms exist for securing MN-HA signaling and/or traffic, there is a need to have a negotiation to agree on the security protocol that is compatible with both the MN and HA. Without a protocol and/or handshaking between the MN, HAC/Security gateway and HA there is no possibility of discovering a common security mechanism at both the MN and a given HA. Exemplary embodiments detailed herein utilize a HAC or security GW to identify at least one security protocol which is common across the MN and an HA for use with Mobile IPv6 and DSMIP6, and the HAC/security GW facilitates setting up a security arrangement between them using a selected one of the one or more common security protocols.

In current specifications for Mobile IPv6 (see for example MOBILITY SUPPORT IN IPv6 by D. Johnson, C. Perkins and J Arkko; Network Working Group Request for Comments 3775 dated June 2004) and dual stack mobile IPv6 (see for example the above-noted MOBILE IPv6 SUPPORT FOR DUAL STACK HOSTS AND ROUTERS), an MN is expected to establish an IPsec SA between itself and a home agent using IKEv2 signaling. An MN can obtain information about the HA to attach to and the IPv6 home address of the HA to use via bootstrapping solutions that have been specified in (see for example MOBILE IPv6 BOOTSTRAPPING IN SPLIT SCENARIO by G. Giaretta, ed.; Network Working Group Request for Comments 5026 dated October 2007) and DHCP OPTIONS FOR HOME INFORMATION DISCOVERY IN MIPv6 by H. Jong, A. Yegin, K. Chowdhury and J. Choi; MIPv6 Working Group, Internet-Draft dated May 22, 2008).

The approaches set forth in the above documents are viable when there is a single security protocol between the MN and HA. However IPsec and IKEv2 are not well suited from an implementation perspective for MIP6, and so the exemplary embodiments detailed herein consider that the MN has the capability of multiple different means by which security for signaling and/or traffic with various different HAs may be implemented. Any given HA may be capable of only one or of a different set of secure signaling means, and the MN is matched to an HA where there is some common security means between them to establish a SA.

There are various security mechanisms, alternative to the IPsec protocol using IKE or IKEv2, for securing MIP6 signaling and/or traffic. One alternative security mechanism is to use TLS for key exchange and bootstrapping, and subsequently using the exchanged keys for securing signaling and/or data through a security association that is established between the MN and the HA. TLS is generally known in the art, see for example TRANSPORT LAYER SECURITY-BASED MOBILE IPv6 SECURITY FRAMEWORK FOR MOBILE NODE TO HOME AGENT COMMUNICATION by J. Korhonen, B. Patil, H. Tschofenig and D Kroeselberg; Mobility Extensions (MEXT) Internet-Draft Updates 3775 dated Jul. 12, 2010. Another alternative security mechanism is to use an authentication extension that enables the signaling to be secured by including an authentication extension in the signaling messages. An example of such an authentication extension may be seen at AUTHENTICATION PROTOCOL FOR MOBILE IPv6 by A. Patel, K. Leung, M. Khalil, H. Akhtar, and K. Chowdhury; Network Working Group Request for Comments 4285, dated January 2006.

Some security mechanisms are specific for control messages or for user data but are not operable or practical for both. By example, the above referenced authentication extension only secures the signaling messages and cannot be used to secure user plane traffic. The above alternatives to IPsec using IKE or IKEv2 are exemplary and not limiting; there are others such as cryptographically generated addresses CGA (for example, as a signature or header extension). CGA may readily be adapted to be robust enough for mobile security associations. But the above listing gives an appreciation that there are a variety of security protocols which may potentially be used, any one or more of which a given MN and a given HA may or may not have the capability of using.

According to exemplary embodiments detailed below, there is a negotiation between an MN and an HAC by which the security framework/mechanism to be used between a MN and an HA is selected/assigned. A given HA for example may support one or more security frameworks. A given HA may for example be capable of supporting MNs which prefer to use IPsec/IKEv2, as well as other MNs which prefer to use a TLS based security solution or other of the alternative solutions noted by example above. The MN and HA are enabled by the HAC to agree on the use of a specific security solution prior to the establishment of that agreed security solution at the HA. Specific exemplary embodiments are set forth below with respect to FIGS. 2-5, with more generic overviews detailed at FIGS. 6-7.

Figure 1:
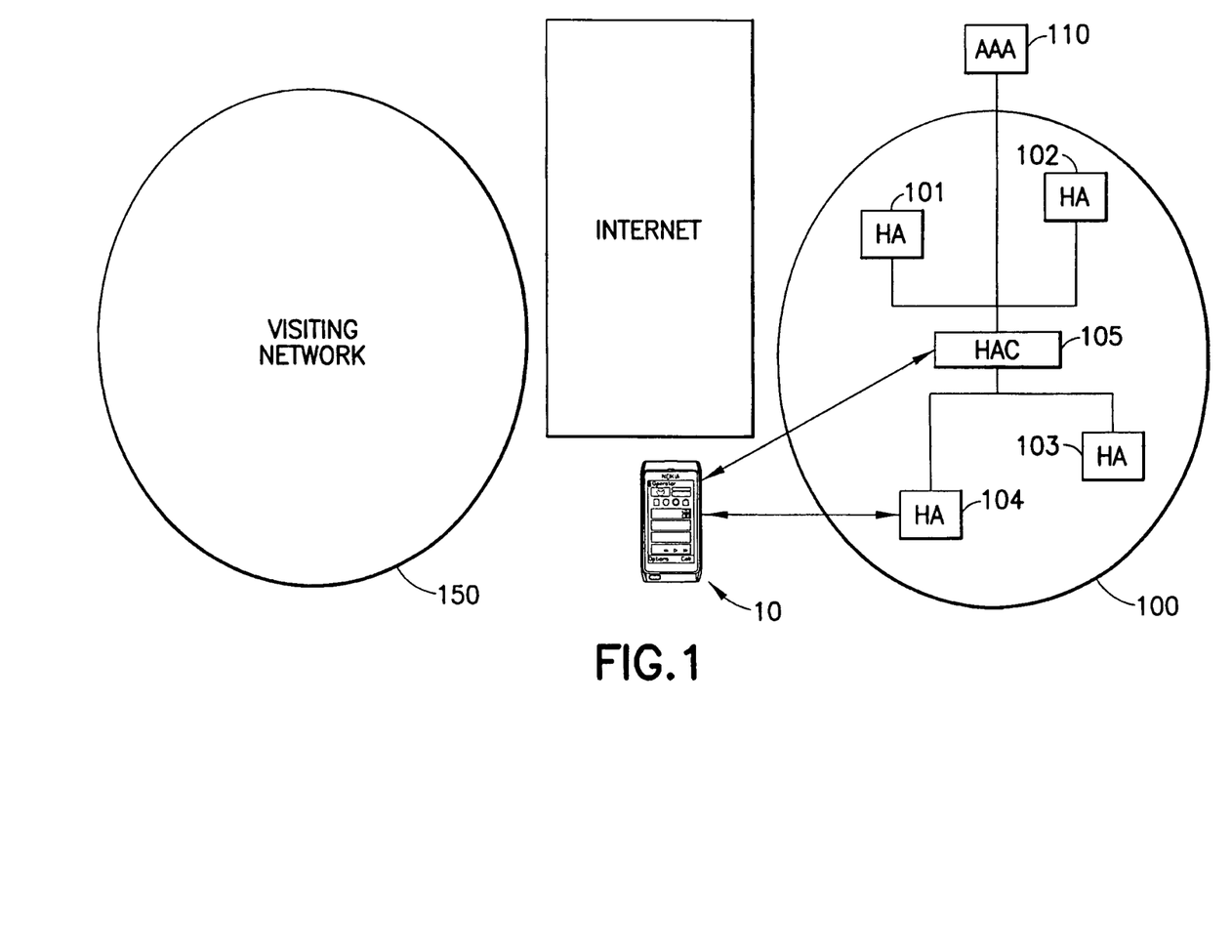
FIG. 1 is a high level block diagram showing an arrangement of various nodes which communicate with one another according to the specific embodiments detailed in other Figures and represents an environment in which these teachings may be used to advantage.

FIG. 1 illustrates an exemplary mobile IP environment as context for the later described exemplary embodiments. A MN 10 operating in its home network 100 seeks to establish a SA with a HA, of which there are several HAs 101-104 illustrated. Assume these various HAs 101-104 do not each have the same capability for secure communications; some may be capable of only one protocol while others may be capable of several different security protocols which one can reasonably assume do not all identically overlap with one another. There is a single security GW in the home network 100, specifically termed at FIG. 1 as a HAC 105. The HAs 101-104 are conventionally routers within the home network 100. The HAC 105 is a control node which in an embodiment may also be embodied as a router, and may or may not be co-located with one of the HAs 101-104. The HAC 105 is aware of the capabilities of the various HAs 101-104 in the home network 100 but the MN 10 generally is not. There may also be an AAA server 110, accessible by the HAC 105 and alternatively also by the HAs 101-104, which stores certain authentication, subscription and billing information for the MN 10. The AAA server 110 may be accessible via the Internet and not necessarily located within the home network 100 itself.

The MN 10 will obtain a home address HoA which remains unchanged as long as the MN is registered with the Home agent in the Home network 100 so that if the MN 100 roams in a visiting network 150 it can still be reachable via that same home address. While roaming in the visiting network 150 the MN 10 is communicating with one of several possible visiting nodes which is termed a correspondent node. The HAs 101-104 use proxy neighbor discovery to represent the MN 10 in the home network 100 while the MN 10 is roaming. Traffic directed to the MN 10 (addressed to its IP home address) will be tunnelled via a care-of address that is current for the MN 10 through the visiting network 150. Once the SA is established with one of the HAs 101-104 only the MN 10 and the HA 101-104 to which it is bound perform security-related processing for packets; MIPv6 is transparent in the core network.

Figure 2:
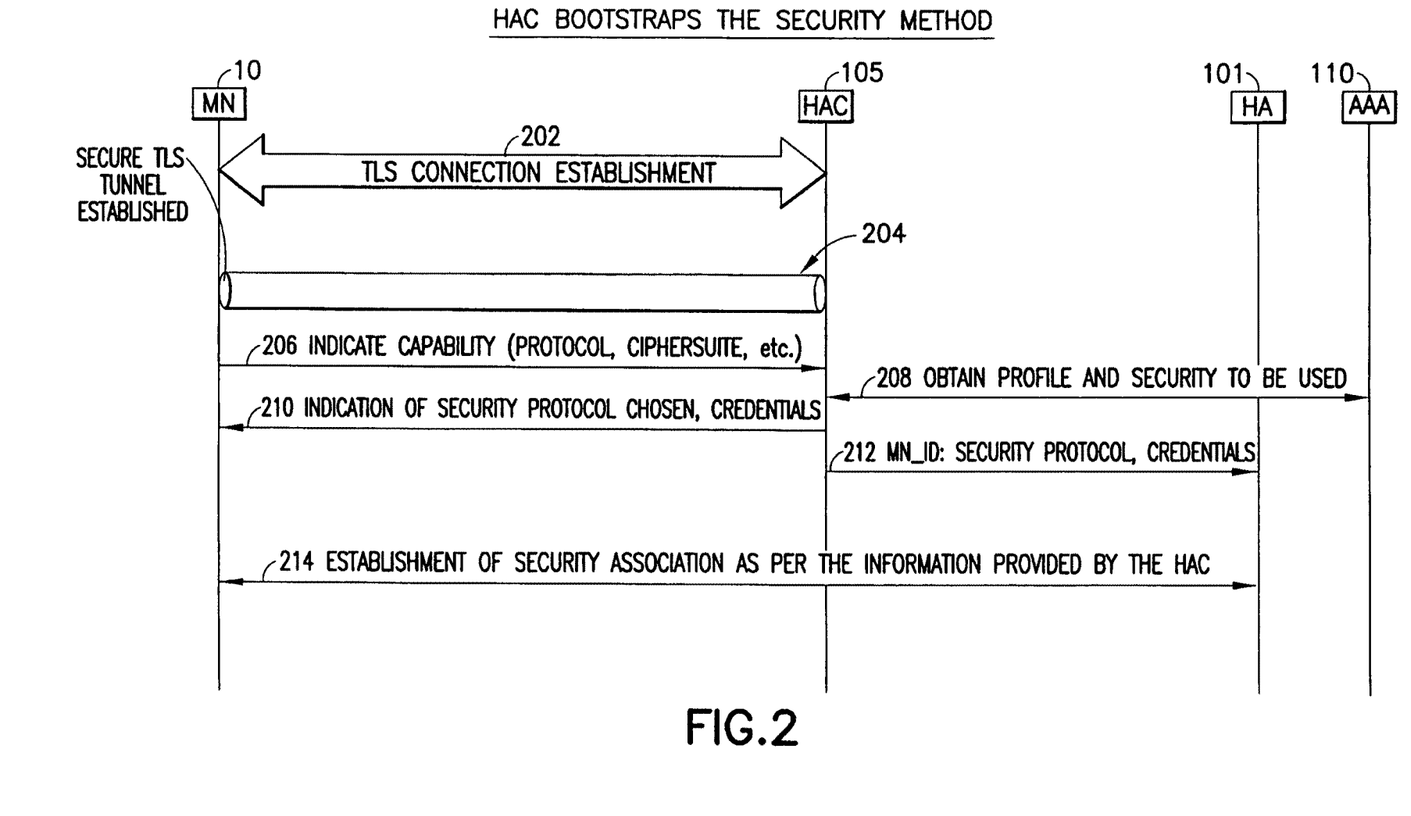
FIGS. 2-3 are signaling diagrams for a negotiation between a mobile node MN and a home agent controller HAC in which the HAC bootstraps the security procedure to a selected/assigned home agent HA with whom the MN establishes MIP6 or DSMIP6 mobility while securing the signaling via the security protocol agreed upon for use between the MN and HA, according to an exemplary embodiment of the invention.
Figure 3:
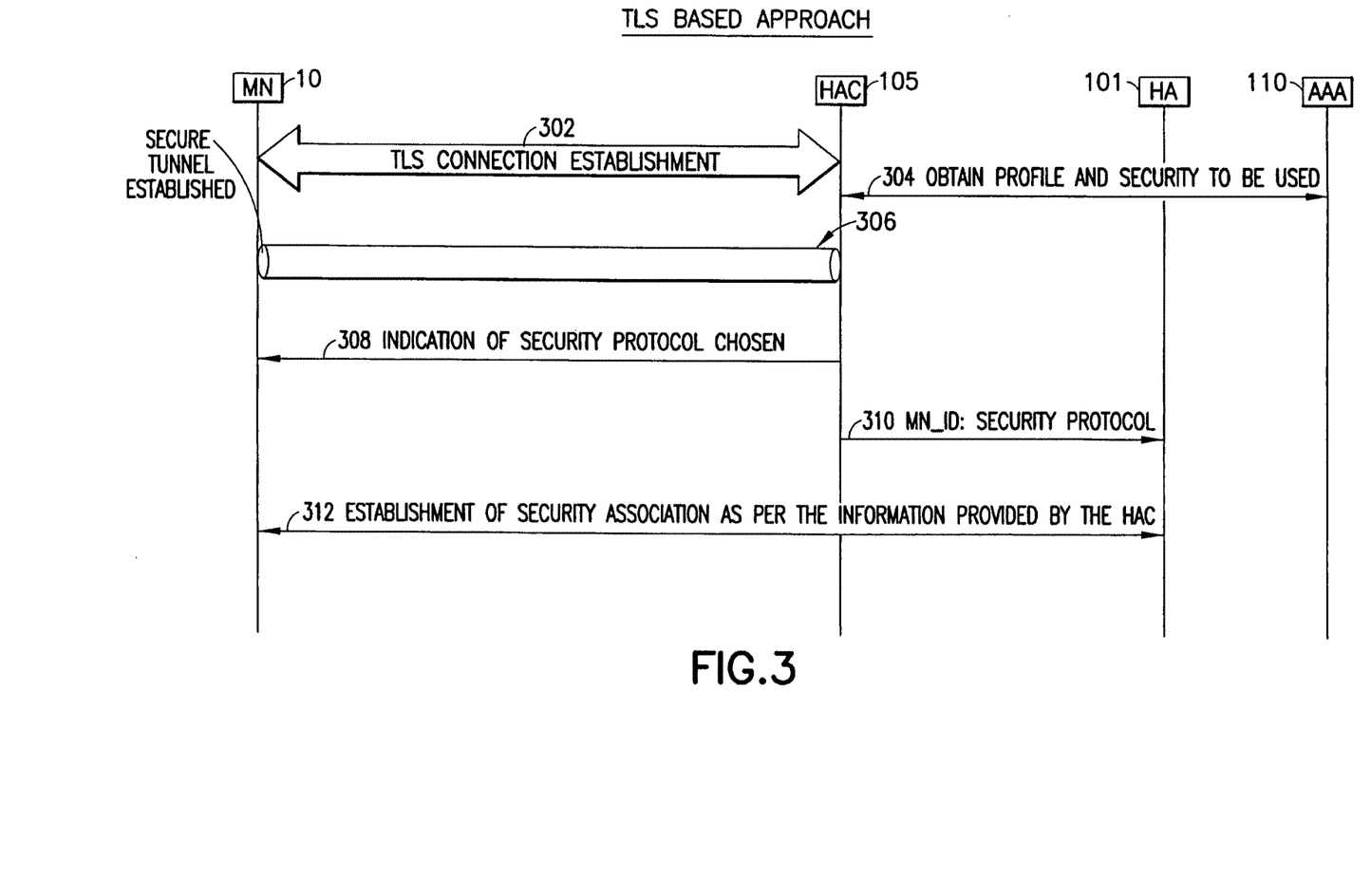
Figure 4:
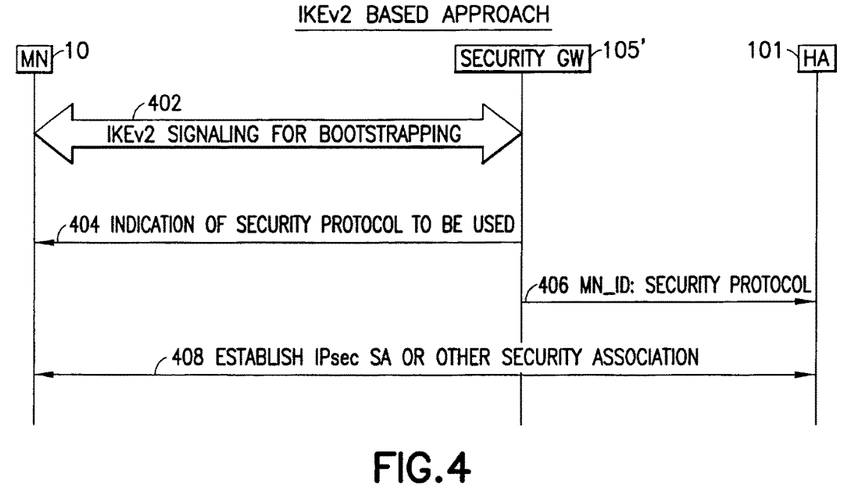
FIG. 4 is a signaling diagram similar to FIG. 3 but in which the MN and a security gateway bootstrap a security association using an IKEv2 key which is terminated prior to the security association being setup between the MN and the HA according to an exemplary embodiment of the invention.
Figure 5:
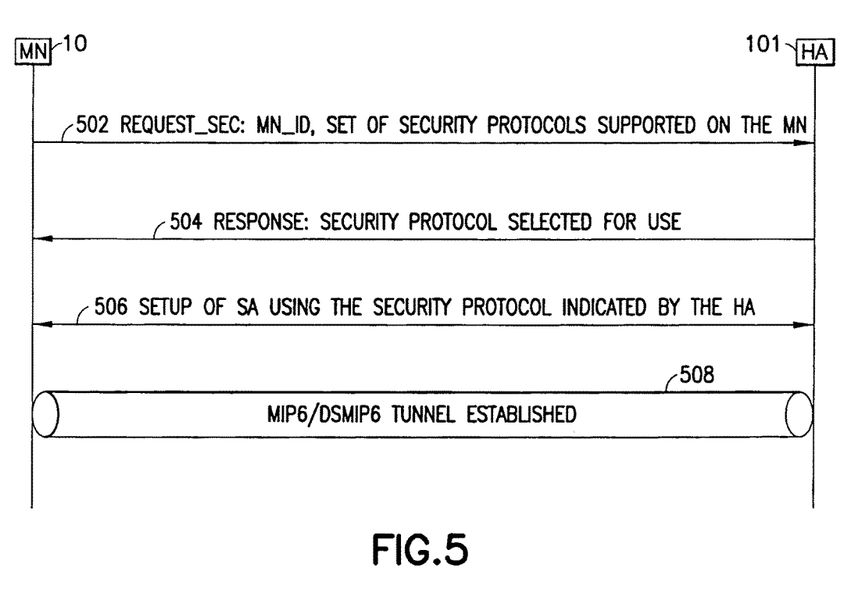
FIG. 5 is a signaling diagram in which the MN knows the address of the HA and uses a specified non-secure message exchange to set up a security association according to an exemplary embodiment of the invention.

The HA in FIGS. 2-4 refer to a selected/assigned one of the HAs 101-104 of FIG. 1, denoted as HA 101 in the signaling diagrams of FIGS. 2-4. FIG. 2 is an exemplary signaling diagram in which a MN seeking to establish a SA with a HA first performs a bootstrapping procedure with a HAC. By example, the MN 10 which seeks to establish a binding with an HA 101-104 or use MIP6/DSMIP6 mobility first performs bootstrapping procedures to discover the address of an HA and obtain the IPv6 home address HoA in addition to keying material and optionally also the IPv4 home address. The HAC 105 Home agent controller (HAC) is the entity that provides the bootstrapping information. For each of FIGS. 2-4 the HAC 105 is aware of (or makes itself aware of) the security protocols and capabilities supported by the HAs 101-104 that are in the domain 100 of the HAC 105. The HAC 105 can be considered as the central entity which a MN 10 communicates with prior to establishing registration with a HA.

At message exchange 202 the MN 10 and the HAC 105 establish a TLS connection and thereby establish a secure tunnel 204. More specifically, in an exemplary embodiment the MN 10 establishes a security association, shown in FIG. 2 as a TLS connection, with the HAC 105. The MN 10 is aware of the address of the HAC 105 already and has the credentials to establish that security association (the TLS connection) with the HAC 105. Within that secure tunnel 204 the MN 10 indicates to the HAC 105 at message 206 its capabilities in terms of the security protocols and cipher suites that the MN 10 supports. By example the HAC 105 obtains the profile of the MN 10 and an indication of which security method should be used (by example, based on the location of the MN 10) from the AAA server 110. The HAC may also be able to decide the security protocol by itself without having to consult the AAA server 110.

The HAC 208 collects profiles and security capabilities of the various HAs 101-104 in its network 100 at representative message exchange 208. Note that exchange 208 may be done prior to the TLS establishment at 202, in which the HAC 105 maintains a current listing of its HAs 101-104 and their respective secure communication capability information which the HAC 105 updates periodically without being triggered by any message exchange with any MN 10.

The HAC 105 checks the security capabilities provided by the MN 10 against its list of HAs 101-104 and their respective security capabilities obtained at representative exchange 208, and from that comparing the HAC 105 selects one HA 101 which has at least one common security capability with the MN 10. Whether there is one security mechanism in common or several, the HAC 105 selects one for use between the MN 10 and the selected/assigned HA 101. In an exemplary embodiment, the HAC's selection of the common security mechanism may be specific for only control signaling and/or may be specific for only transfer of user data. That is, in some embodiments the HAC 105 may select one common security mechanism for control data and another common security for user data for simultaneous use between one particular MN 10 and one selected/assigned HA 101. This is because certain security mechanisms may be operable only for control signaling or for data, but not both.

Still within the secure tunnel 204 the HAC 105 provides to the MN 10 at message 210 bootstrapping parameters, including the address of the selected/assigned HA 101, the IPv6 home address HoA, and optionally other bootstrapping information. Message 210 additionally includes the selected security protocol to be used with that HA, and if applicable an indication of whether the selected solution is for control signaling or for data or for both. The HAC provides the keys and/or other credentials that are required to the MN at message 210, and provides the same to the selected/assigned HA 101 at message 212 along with the identity of the MN 10, for the type of security protocol that will be used to establish an SA between the MN 10 and the selected/assigned HA 101.

As one specific example, the HAC 105 may indicate to the MN 10 in message 210 that IPsec/IKEv2 needs to be used as the security mechanism with the assigned HA 101, and similar to the HA 101 at message 212. The HAC 105 can then provide the keys or credentials that will be used between the MN 10 and the HA 101 for IKEv2 signaling to establish the IPsec SAs for signaling and/or user-plane traffic. The indication of the selected security protocol and the credentials/keys may be in a same message 210/212 as illustrated at FIG. 2, or may be provided in separate messages in an alternative embodiment. Now that both the MN 10 and the HA 101 know the selected security protocol and have the security key(s), they establish a security association at message exchange 214. By example the MN 10 initiates signaling with the assigned HA 101 and uses the selected security protocol indicated by the HAC 105 at message 210 (e.g., IPsec, Authentication protocol, TLS based security) to setup the security associations to be used for signaling and user-plane traffic, which may also be considered to be within message exchange 214.

FIG. 3 is an exemplary signaling diagram in which the MN 10 establishes a TLS connection with the HAC and the HAC bootstraps the MN via messages which are exchanged between the MN and the HAC inside the TLS connection. In FIG. 3 the HAC 105 performs bootstrapping in the case of the TLS based approach, but alternatively the IPsec gateway/AAA performs bootstrapping where IKEv2 is terminated in the case of IPsec based security. In each of these implementations the HAC 105 or more generically the security gateway provides the MN 10 an indication about the selected security protocol to be used between the MN 10 and the selected (assigned) HA 101.

Specifically, at FIG. 3 the MN 10 and the HAC 105 establish a TLS connection via message exchange 302 and thereby establish a secure tunnel 306. As with FIG. 2, at FIG. 3 the MN 10 is already aware of the address of the HAC 105 already and has the credentials to establish the TLS connection 302/306 with the HAC 105. Upon initiation of the SA by message exchange 302 the HAC 105 obtains the profile of the MN 10 and an indication of which security method should be used (by example, based on the location of the MN 10) from the AAA server 110, similar to that shown at FIG. 2 at message exchange 208. As with FIG. 2, at FIG. 3 the HAC 105 may also be able to decide the security protocol by itself without having to consult the AAA server 110. The HAC 105 is assumed to use the current listing which it maintains of its HAs 101-104 and their respective secure communication capability information, but like FIG. 2 it may instead fetch this information prior to message 308.

The HAC 105 checks the security capabilities of the MN 10 which it received from the AAA 110 against its current list of HAs 101-104 and their respective security capabilities stored in its local memory, and from that comparing the HAC 105 selects one HA 101 which has at least one common security capability with the MN 10. Like FIG. 2, the HAC 105 selects one or more common security mechanisms, which may be specific for only control signaling and/or may be specific for only transfer of user data.

Within the secure tunnel 306 the HAC 105 provides to the MN 10 at message 308 an indication of the selected security protocol to be used with the selected/assigned HA 101, and if applicable an indication of whether the selected solution is for control signaling or for data or for both. The HAC 105 also provides the MN 10 with the identity of the selected/assigned HA 101 at message 308. At message 310 the HAC 105 informs the selected/assigned HA 101 of the identity of the MN 10 and an indication of the selected security protocol. The MN 10 then initiates signaling with the assigned HA 101 at message exchange 312 using the selected security protocol indicated by the HAC 105 at message 308 to setup the security associations to be used for signaling and user-plane traffic, which may also be considered to be within message exchange 312.

As noted above, for the case of IKEv2 signaling the HAC 105 may be represented more generically by an IPSec gateway, and this arrangement is shown particularly at FIG. 4. In this case the IKEv2 signaling between the MN 10 and the IPsec gateway 105' would provide the choice of security protocol suite and the bootstrapping parameters. The security association in this case will be IPsec since IKEv2 was used. Specifically, at FIG. 4 the MN 10 and the security GW 105' establish IKEv2 signaling for bootstrapping at message exchange 402. The security GW 105' fetches the MN's profile from the AAA (not shown) or gets a list of its capabilities form the MN 10 itself, and consults its current list of HA capabilities (or fetches them from the HAs 101-104 themselves) to select a common security protocol.

Within the secure IKEv2 signaling setup at 402 the security GW 105' provides to the MN 10 at message 404 an indication of the selected security protocol (e.g., IPsec) to be used with the selected/assigned HA 101, the identity of the selected/assigned HA 101, bootstrapping parameters, and optionally an indication of whether the selected solution is for control signaling or for data or for both. At message 406 the security GW 105' informs the selected/assigned HA 101 of the identity of the MN 10 and an indication of the selected security protocol. The MN 10 then initiates signaling with the assigned HA 101 at message exchange 408 using the selected security protocol indicated by the security GW 105' at message 404 to setup the security associations to be used for signaling and user-plane traffic, which may also be considered to be within message exchange 408.

FIG. 5 is a signaling diagram illustrating a signaling exchange between the MN 10 and an HA 101 directly, prior to performing registration, with bootstrapping directly by the HA 101. The example of FIG. 5 is relevant for the case where the MN 10 is aware of the specific HA 101 to be used, that is, the MN 10 knows the address of the HA 101 such as via manual configuration on the MN 10 or via out-of-band signaling between them.

At request message 502 the MN 10 indicates its identity and the set of security protocols that the MN 10 is capable of using to establish an SA with the specific HA 101. The HA 101 checks the received list of security protocols which the MN 10 supports against those the HA 101 itself supports, and at message 504 the HA 101 responds with an indication of a selected security protocol or protocols if there is one or more in common found from the comparing. In this FIG. 5 embodiment it is the HA 101 which has the authority of selecting the security protocol to be used between itself and the MN 10 for securing signaling and optionally user plane traffic. Then at message exchange 506 the SA is setup between the MN 10 and the specific HA 101 using the selected security protocol(s) and a secure tunnel is established at 508 using MIP6 or DSMIP6 for example.

In the FIG. 5 embodiment above, mobile IPv6 signaling messages can also be extended to carry the information about the security capabilities of the MN 10 and the security protocol selected by the HA 101. In order to inter-operate with legacy HAs, those which do not have the capability to negotiate the security mechanism, when such an HA's address is manually configured in the MN 10 as noted above (or provisioned using out of band mechanisms also noted above), then the security mechanism supported by the HA must also be configured or provisioned as the case may be. In this manner the MN 10 would already know the security protocol capability of the legacy HA prior to any signaling exchange between them (excluding the out-of band provisioning option).

An alternative implementation of FIG. 5 is for the request 502 by the MN 10 to be for the HA 101 to send in reply the HA's list of supported security protocols, which the MN 10 checks against its own supported set and the MN 10 makes the selection of which will be used for the SA. In this case the message 502 still includes the MN identity but the response message 504 is the HA's list of security protocols the HA 101 supports. In the message exchange 506 the MN 10 would then begin by indicating the security protocol it selected for the SA.

Of the various embodiments detailed above, the bootstrapping options detailed at FIGS. 2-4 are the most robust and the TLS implementations at FIG. 3 provides the greatest security since bootstrapping is done within the secure TLS tunnel.

Technical effects of the various embodiments detailed herein by example provide the ability to choose the preferred security protocol to be used between an MN and HA in the presence of multiple security solutions. The negotiation of security protocol enables network operators to deploy an HA which supports multiple security protocols and serve different types of mobile nodes which differ in terms of the security protocol that is implemented on those mobile nodes, and solves the problem where multiple security problems exist for Mobile IPv6.

Figure 6:
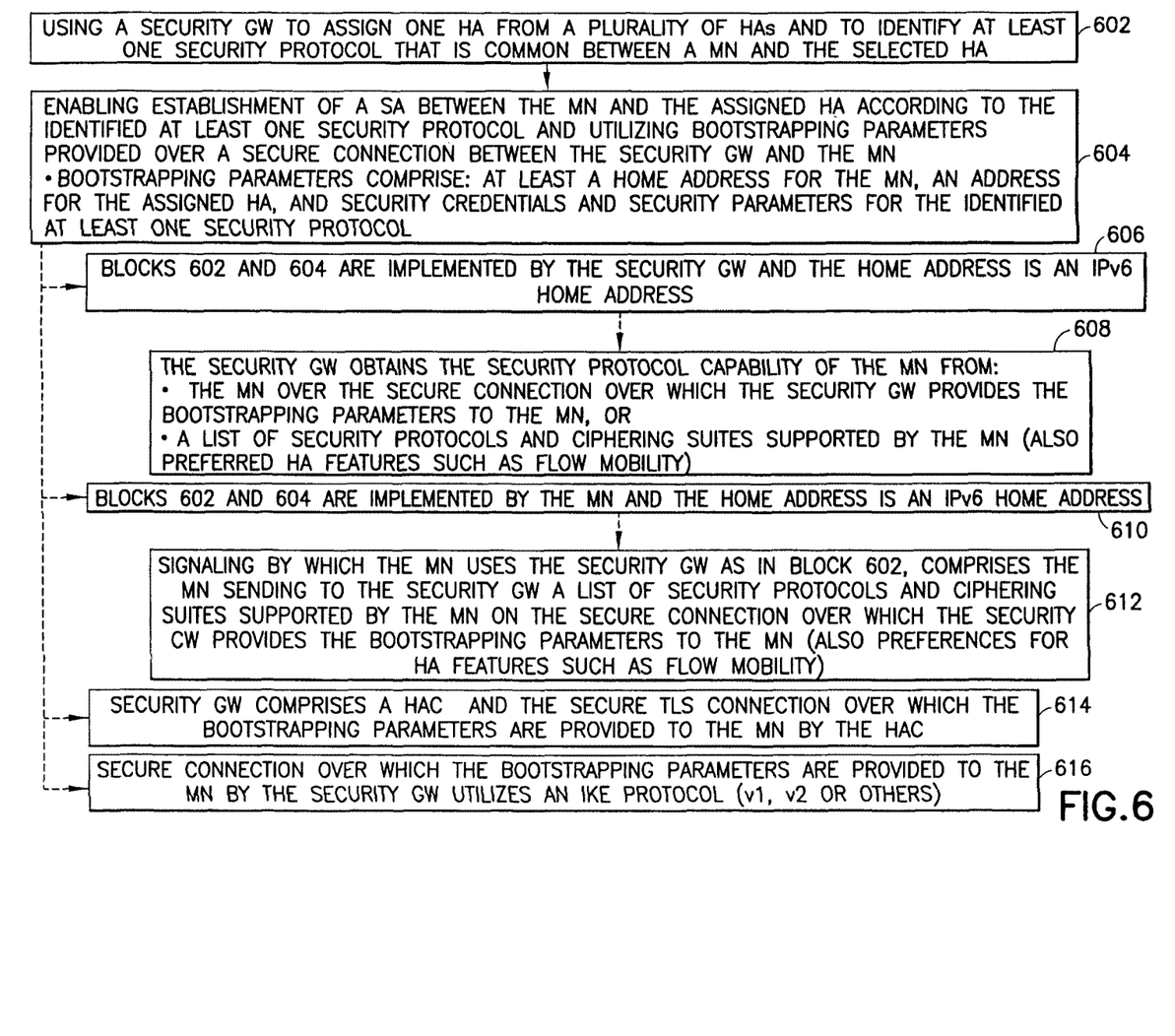
FIGS. 6-7 are process flow diagrams showing method steps, or actions taken by an apparatus or in response to executing an embodied computer software program according to various exemplary embodiments of the invention.

Certain of the above exemplary embodiments are summarized with reference to FIG. 6, which may be considered to represent method steps executed by the mobile node or the security gateway or components thereof, or actions performed by an apparatus such as the mobile node or the security gateway or components thereof, or functional steps taken by an apparatus as may be implemented by a memory storing a computer program which are executed by one or more processors. At block 602 there is the step or action of using a security gateway to select or assign one home agent from a plurality of home agents and to identify at least one security protocol that is common between a mobile node and the selected/assigned home agent. At block 604 there is the step or action of enabling establishment of a security association between the mobile node and the selected/assigned home agent according to the identified at least one security protocol and utilizing bootstrapping parameters provided over a secure connection between the security gateway and the mobile node. As set forth at block 604, the bootstrapping parameters comprise at least a home address HoA for the mobile node, an address for the assigned home agent, and security credentials and security parameters for the identified at least one security protocol.

For the case in which blocks 602 and 604 are implemented by the security gateway as in block 606, the selecting and identifying at block 602 are done at least by the security gateway comparing a security protocol capability of the mobile node against security capabilities of the plurality of home agents, and enabling the establishment of the security association at block 604 is done by the security gateway by sending to the mobile node over the secure connection the bootstrapping parameters, an identity of the selected/assigned home agent, and an indication of the identified at least one security protocol, and by sending to the selected/assigned home agent an identity of the mobile node and an indication of the identified at least one security protocol. The home address of block 604 is specified in block 606 particularly as an IPv6 Home Address.

Further following implementation by the security gateway at block 606 there is further detail at block 608 of the security gateway obtaining the security protocol capability of the mobile node via a list of security protocols and cipher suites which the mobile node supports which the security gateway receives from the mobile node over the secure connection over which the security gateway provides the bootstrapping parameters to the mobile node. The security gateway may further receive from the mobile node a flow mobility capability, and assign the home agent based on the home agent supporting the mobile node's flow mobility (in addition to a common security protocol and cipher suite).

For the case in which blocks 602 and 604 are implemented by the mobile node as in block 610, using the security gateway at block 602 is via signaling such as detailed at FIGS. 2-4 to learn which HA is the assigned HA, and the mobile node enables the establishment of the security association at block 604 by utilizing the bootstrapping parameters provided by the security gateway over the secure connection to initiate the security association with the selected/assigned one home agent which was indicated by the security gateway to the mobile node. The home address of block 604 is also specified in block 610 particularly as an IPv6 Home Address Further following implementation by the mobile node at block 610 there is the optional block 612 in which the signaling mentioned above, by which the mobile node uses the security gateway as set forth in block 602, comprises the mobile node sending to the security gateway a list of security protocols and ciphering suites which the mobile node supports, and possibly also HA features such as flow mobility which the MN prefers. These are sent on the secure connection over which the security gateway provides the bootstrapping parameters to the mobile node.

For implementation by the security gateway or the mobile node, block 614 of FIG. 6 stipulates that the security gateway comprises a home agent controller and the secure connection over which the bootstrapping parameters are provided to the mobile node by the home agent controller utilizes transport layer security, as seen at FIGS. 2-3. Similarly for either gateway or mobile node, block 616 of FIG. 5 stipulates that the secure connection over which the bootstrapping parameters are provided to the mobile node by the security gateway utilizes an internet key exchange protocol, as seen at FIG. 4.

Figure 7:
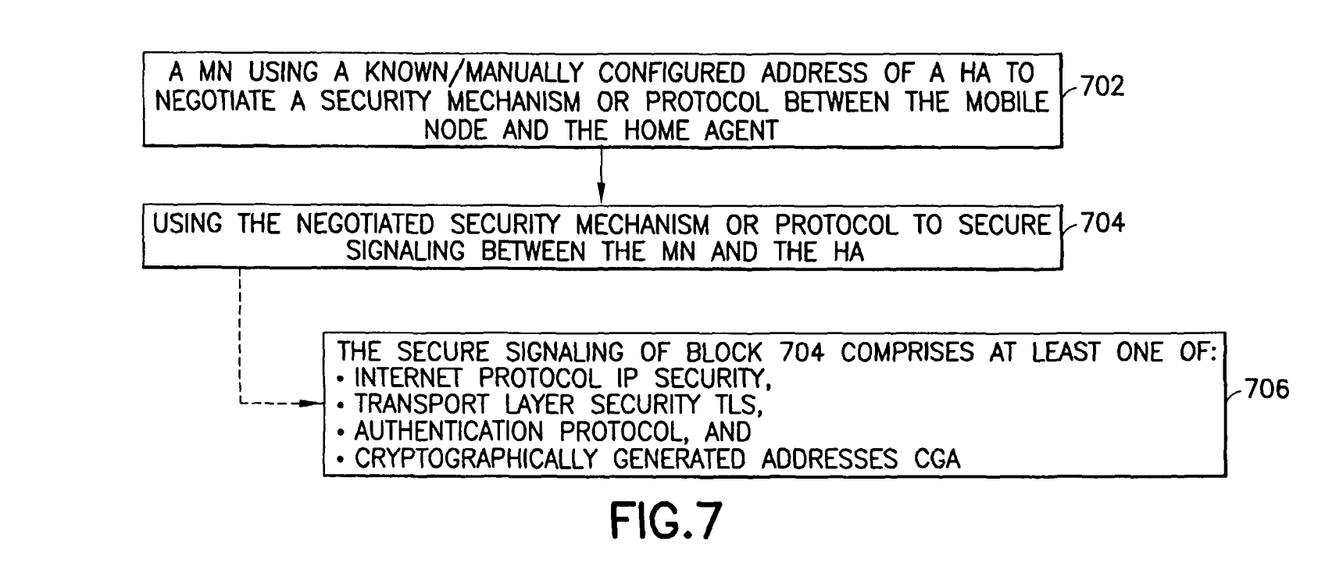

Other of the above exemplary embodiments are summarized with reference to FIG. 7, which may be considered to represent method steps executed by the mobile node or components thereof, or actions performed by an apparatus such as the mobile node or components thereof, or functional steps taken by an apparatus as may be implemented by a memory storing a computer program which are executed by one or more processors. At block 702 there is the step or action of the mobile node using a known/manually configured address of a home agent to negotiate a security mechanism or protocol between the mobile node and the home agent. At block 704 there is the step or action of using the negotiated security mechanism or protocol to secure signaling between the mobile node and the home agent.

At optional block 706, the secure signaling of block 702 comprises at least one of Internet protocol IP security, transport layer security TLS, authentication protocol, and cryptographically generated addresses CGA, as detailed at FIG. 5 above.

Figure 8:
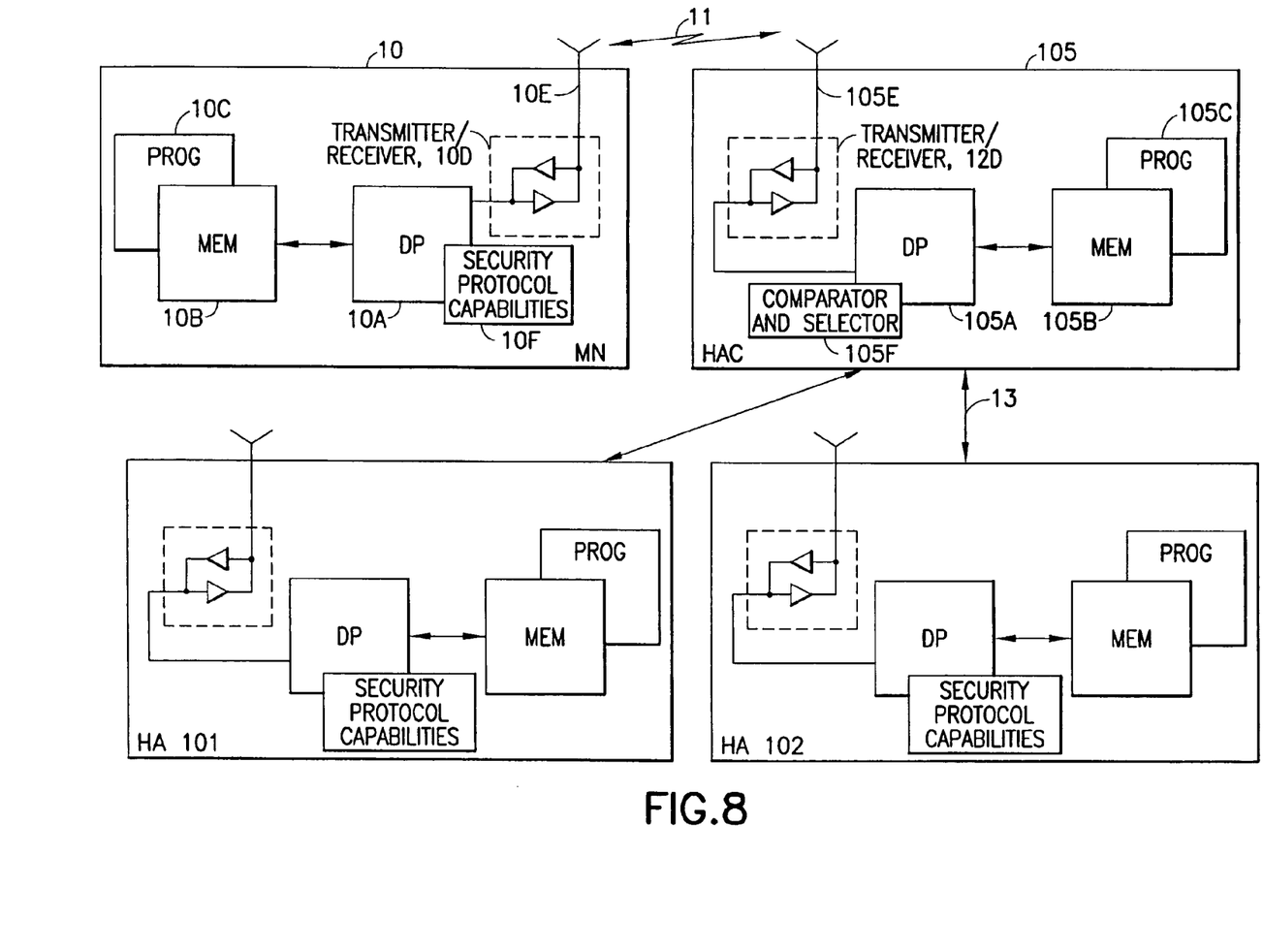
FIG. 8 is a high level block diagram of various devices used in carrying out various aspects of the invention.

Reference is now made to FIG. 8 for illustrating a simplified block diagram of various electronic devices that are suitable for use in practicing the exemplary embodiments of this invention. In FIG. 8 a wireless home network (which excludes the MN 10) is adapted for communication between a UE in the position of the mobile node 10 and a HAC 105 (and after selection of HA and security protocol between the MN 10 and the selected/assigned HA 101). The network may include further nodes not specifically shown (by non-limiting example a non-secure access node, a user plane entity UPE, a mobility management entity MME, or a system architecture evolution gateway SAE-GW). It is understood from FIG. 1 that the HAs 101, 102 and possibly also the HAC 105 directly interface to the Internet.

The MN 10 includes a data processor (DP) 10A, a memory (MEM) 10B that stores a program (PROG) 10C, and a suitable radio frequency (RF) transmitter and receiver 10D coupled to one or more antennas 10E for bidirectional wireless communications over a communication link 13 with the HAC 105. The communication link 13 includes both insecure channels and secure channels such as the TLS and IPv6 implementations shown in detail above. The HAC 105 also includes a DP 105A, a MEM 105B that stores a PROG 105C, and a suitable RF transmitter and receiver 105D coupled to one or more antennas 105E. The HAC 105 is coupled via a data path 13 (wired or wireless) to each of the plurality of HAs 101, 102, and optionally also to the internet or other broader communication network. Also at the MN 10 is software embodied on one or more memories which gives the MN 10 capability to communicate using various different security protocols, and at functional block 10F a stored listing of these various security protocols. The HAs 101, 102 have a similar embodied software and stored listing. The HAC 105 has at functional block 105F a comparator and selector, for comparing the capabilities of the MN 10 against those of the various HAs 101, 102, and for selecting an HA 101 and one or more security protocols (if different protocols are used for control signaling and for data) in common between them.

At least one of the PROGs 10C and 105C is assumed to include computer readable instructions or computer program code that, when executed by the associated DP, enable the electronic device to operate in accordance with the exemplary embodiments of this invention as was detailed above by non-limiting examples.

In general, the exemplary embodiments of this invention may be implemented by computer software executable by the DP 10A of the MN 10 and by the DP 105A of the HAC 105, or by hardware, or by a combination of tangibly embodied software and/or firmware and hardware. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and other types of tangible memories for storing computer readable instructions or code to carry out the various embodiments of the invention detailed above.

In general, the various embodiments of the MN 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 105B may be of any type suitable to the local technical environment and may be implemented using any suitable data storage technology, such as semiconductor based memory devices, magnetic memory devices and systems, optical memory devices and systems, fixed memory and removable memory. The DPs 10A and 105A may be of any type suitable to the local technical environment, and may include one or more of general purpose computers, special purpose computers, microprocessors, digital signal processors (DSPs) and processors based on a multicore processor architecture, as non-limiting examples.

While various aspects of the exemplary embodiments of this invention may be illustrated and described as block and signaling diagrams such as FIGS. 2-7, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   assigning, by a security gateway one home agent from a plurality of home agents, that has more than one security protocol and cipher suite for use with mobile IPv6 and dual stack mobile IPv6, that is common to a security protocol capability of a mobile node, in which the assigning comprises comparing, by the security gateway, a list of more than one security protocol and cipher suite of the mobile node indicated in signaling to the security gateway, to multiple different security protocols and cipher suites supported by the plurality of home agents to identify the one home agent with the common more than one security protocol and cipher suite, wherein different ones of the more than one security protocol and cipher suite are identified for controlling signaling and user data transfer, respectively, between the mobile node and the one home agent, in which the list signaled to the security gateway is from a security server, and in which the comparing comprises comparing the list to a list, that is stored in a local memory of the security gateway, of the multiple different security protocols and cipher suites supported by each of the plurality of home agents;

sending, by the security gateway, to the mobile node over a secure connection bootstrapping parameters, an identity of the assigned home agent, and an indication of the identified more than one security protocol and cipher suite and the different ones of the more than one security protocol and cipher suite assigned for the control signaling and the user data transfer, respectively, wherein the identified more than one security protocol and cipher suite comprises one common security protocol and cipher suite for the control data and another for the user data for simultaneous use between the mobile node and the assigned home agent;

sending, by the security gateway, to the assigned home agent an identity of the mobile node, and more than one security protocol and cipher suite of the list that is common to both the mobile node and the assigned home agent; and enabling, by the security gateway, establishment of a security association between the mobile node and the assigned home agent, for the use with mobile IPv6 and dual stack mobile IPv6, according to the identified more than one security protocol and cipher suite, comprising utilizing the bootstrapping parameters provided over the secure connection between the security gateway and the mobile node, in which the bootstrapping parameters comprise at least an IPv6 home address for the mobile node, and an address of the assigned home agent and security credentials and security parameters for the identified more than one security protocol and cipher suite to enable the establishment of the security association.

2. The method according to claim 1, in which the security gateway obtains the security protocol capability of the mobile node from the mobile node over the secure connection over which the security gateway provides the bootstrapping parameters to the mobile node.

3. The method according to claim 1, in which the security gateway receives from the mobile node the list of security protocols and cipher suites which the mobile node supports and uses the received list for the comparing.

4. The method according to claim 3, in which the security gateway further receives from the mobile node a flow mobility capability and the home agent is assigned based on the home agent supporting the mobile node's flow mobility.

5. The method according to claim 1, in which the method is executed by the mobile node which, via signaling, uses the security gateway to learn the assigned one home agent and the identified more than one security protocol and cipher suite that is common, and which enables establishment of the security association by utilizing the bootstrapping parameters provided by the security gateway over the secure connection to initiate the security association with the assigned one home agent.

6. The method according to claim 5, in which the signaling comprises the mobile node sending to the security gateway via IPv6 signaling the list of security protocols and cipher suites which the mobile node supports.

7. The method according to claim 6, in which the mobile node sends the list of security protocols and cipher suites on the secure connection over which the mobile node receives the bootstrapping parameters from the security gateway.

8. The method according to claim 1, in which the security gateway comprises a home agent controller and the secure connection over which the bootstrapping parameters are provided to the mobile node by the home agent controller utilizes transport layer security.

9. A memory tangibly embodying a program of computer readable instructions which when executed by at least one processor result in actions comprising:

assigning, with a security gateway, one home agent from a plurality of home agents, that has more than one security protocol and cipher suite for use with mobile IPv6 and dual stack mobile IPv6, that is common to a mobile node, in which the assigning comprises comparing, with the security gateway, a list of more than one security protocol and cipher suite of the mobile node indicated in signaling to the security gateway, to multiple different security protocols and cipher suites supported by the plurality of home agents to identify the one home agent with the common more than one security protocol and cipher suite, wherein different ones of the more than one security protocol and cipher suite are assigned for controlling signaling and user data transfer, respectively, between the mobile node and the one home agent, in which the list signaled to the security gateway is from a security server, and in which the comparing comprises comparing the list to a list, that is stored in a local memory of the security gateway, of the multiple different security protocols and cipher suites supported by each of the plurality of home agents;

sending, with the security gateway, to the mobile node over a secure connection bootstrapping parameters, an identity of the assigned home agent, and an indication of the identified more than one security protocol and cipher suite, and an indication of the different ones of the more than one security protocol and cipher suite assigned for the control signaling and the user data transfer, respectively;

sending, with the security gateway, to the assigned home agent an identity of the mobile node, and more than one security protocol and cipher suite of the list that is common to both the mobile node and the assigned home agent, wherein the identified more than one security protocol and cipher suite comprises one common security protocol and cipher suite for the control signaling and another for the user data for simultaneous use between the mobile node and the assigned home agent; and enabling establishment of a security association between the mobile node and the assigned home agent, for use with mobile IPv6 and dual stack mobile IPv6, according to the identified more than one security protocol and cipher suite, comprising utilizing bootstrapping parameters provided over a secure connection between the security gateway and the mobile node, in which the bootstrapping parameters comprise at least an IPv6 home address for the mobile node, an address of the assigned home agent, and security credentials and security parameters for the identified more than one security protocol and cipher suite to enable the establishment of the security association.

10. The memory according to claim 9, in which the memory and the at least one processor are embodied within the mobile node which, via signaling, uses the security gateway to learn the assigned one home agent and the identified more than one security protocol and cipher suite that is common, and which enables establishment of the security association by utilizing the bootstrapping parameters provided by the security gateway over the secure connection to initiate the security association with the assigned one home agent.

11. An apparatus comprising:
at least one processor; and
at least one memory storing computer program code;
the at least one memory and computer program code configured with the at least one processor to cause the apparatus to perform at least:
assign, with a security gateway, one home agent from a plurality of home agents, that has more than one security protocol and cipher suite for use with mobile IPv6 and dual stack mobile IPv6, that is common between a mobile node, in which the assigning comprises comparing a list of more than one security protocol and cipher suite of the mobile node indicated in signaling to the security gateway, to multiple different security protocols and cipher suites supported by the plurality of home agents to identify the one home agent with the common more than one security protocol and cipher suite, wherein different ones of the more than one security protocol and cipher suite are assigned for controlling signaling and user data transfer, respectively, between the mobile node and the one home agent, in which the list signaled to the security gateway is from a security server, and in which the comparing comprises comparing the list to a list, that is stored in a local memory of the security gateway, of the multiple different security protocols and cipher suites supported by each of the plurality of home agents;
send to the mobile node over a secure connection bootstrapping parameters, an identity of the assigned home agent, and an indication of the identified more than one security protocol and cipher suite, and an indication of the different ones of the more than one security protocol and cipher suite assigned for the control signaling and the user data transfer, respectively, wherein the identified more than one security protocol and cipher suite comprises one common security protocol and cipher suite for the control signaling and another for the user data for simultaneous use between the mobile node and the assigned home agent;
send to the assigned home agent an identity of the mobile node, and an indication of the more than one security protocol and cipher suite of the list that is common to both the mobile node and the assigned home agent; and
enable establishment of a security association between the mobile node and the assigned home agent, for the use with mobile IPv6 and dual stack mobile IPv6, according to the identified more than one security protocol and cipher suite, comprising utilizing bootstrapping parameters provided over a secure connection between the security gateway and the mobile node, in which the bootstrapping parameters comprise at least an IPv6 home address for the mobile node, an address of the assigned home agent, and security credentials and security parameters for the identified more than one security protocol and cipher suite to enable the establishment of the security association.

12. The apparatus according to claim 11, in which the security gateway obtains the security protocol capability of the mobile node from the mobile node over the secure connection over which the security gateway provides the bootstrapping parameters to the mobile node.

13. The apparatus according to claim 11, in which the security gateway receives from the mobile node the list of security protocols and cipher suites which the mobile node supports and uses the received list for the comparing.

14. The apparatus according to claim 11, in which the security gateway further receives from the mobile node a flow mobility capability and the home agent is assigned based on the home agent supporting the mobile node's flow mobility using IPv6.

15. The apparatus according to claim 11, in which the apparatus comprises the mobile node, in which the at least one memory and computer program code are configured with the at least one processor to cause the mobile node to:
use the security gateway via signaling to learn the assigned one home agent and the identified more than one security protocol and cipher suite that is common, and enable establishment of the security association by utilizing the bootstrapping parameters provided by the security gateway over the secure connection to initiate the security association with the assigned one home agent.

16. The apparatus according to claim 15, in which the signaling comprises the mobile node sending to the security gateway the list of security protocols and cipher suites which the mobile node supports.

17. The apparatus according to claim 16, in which the mobile node is configured to send the list of security protocols and cipher suites on the secure connection over which the mobile node receives the bootstrapping parameters from the security gateway.

* * * * *